United States Patent [19]

Bomberger

[11] 3,722,968

[45] Mar. 27, 1973

[54] WHEEL-BEARING ASSEMBLY

[75] Inventor: Arthur L. Bomberger, Lancaster, Pa.

[73] Assignee: National Bearings Company, Lancaster, Pa.

[22] Filed: June 29, 1967

[21] Appl. No.: 649,986

[52] U.S. Cl. ................................................. 308/191
[51] Int. Cl. .............................................. F16c 33/30
[58] Field of Search ........ 308/190, 191, 6 A, 38, 208, 308/210

[56] References Cited

UNITED STATES PATENTS 2,928,701  3/1960  Ferdig ................................. 308/190
2,995,405  8/1961  Ferdig ................................. 308/190
3,171,697  3/1965  Nicalaides .......................... 308/190

Primary Examiner—Charles J. Myhre
Assistant Examiner—Frank Susko
Attorney—Sughrue, Rothwell, Mion, Zinn & Macpeak

[57] ABSTRACT

A ball bearing-wheel assembly has an outer nylon tire partially enclosing a stamped metal cup which serves as the outer race for the balls. The nylon tire has the inner surface of its peripheral wall adapted to securely engage the peripheral wall of the stamped metal cup, thereby retaining the balls between the inner and outer races and the base portion of the tire.

6 Claims, 4 Drawing Figures

Patented March 27, 1973

3,722,968

INVENTOR
ARTHUR L. BOMBERGER

BY *Sughrue, Rothwell, Mion, Zinn & Macpeak*

ATTORNEYS

WHEEL-BEARING ASSEMBLY

This invention relates to an improved wheel-bearing assembly having its structural components particularly adapted to produce a bearing structure in the form of a wheel which is capable of smooth and quiet operation and of carrying loads which are proportionately heavier than other prior art bearing structures of this general type.

Wheel-bearing structures are, of course, well known and commercially available. However, the greater majority of these wheel-bearing structures lack the ability to carry relatively heavy loads while at the same time maintaining a smooth and quiet operation. Usually, the prior art bearing structures which are specifically designed to carry increased loads require both the inner and outer races to be formed of a strong metallic material in order to provide the hardness and strength required to support the heavier loads. In that these high strength bearing structures are made almost entirely of metal, they are generally not as quiet and smooth running during operation as other prior art bearing structures made primarily of a plastic or like material. On the other hand, lighter weight bearing structures are designed primarily for smooth, quiet operation having the outer race portion formed entirely of a plastic material which also serves as an outer tire member having its outer surface in rolling contact with a metal track or like surface on which the bearing operates. While providing quietness in operation, these lightweight bearing structures have the disadvantage of light load carrying capabilities.

Other prior art bearing structures have attempted to fulfill the need of a quiet, smooth running bearing capable of carrying heavy loads by providing a bearing which has a high strength metallic outer race permanently coated by molding a plastic or like material tire to the metallic race. These bearing structures have the obvious disadvantage of higher costs and longer production time in that the assembling of these bearing structures is greatly complicated due to the molding or heat treating methods used to secure the outer tire to the metal race.

The present invention eliminates the above described disadvantages by providing a bearing structure for a wheel or similar device with a stamped metal cup which serves as the outer race for the ball bearings and which is partially encased by a preformed tire of nylon or similar plastic material, thereby providing a bearing assembly which is quiet and smooth in operation and is capable of carrying heavy loads. The production and assembly of the present bearing structure is greatly simplified in that the tire member is adapted to be press fitted into secure engagement with the stamped metal cup.

The invention will be more fully described with reference to the accompanying drawings in which.

Figure 1:
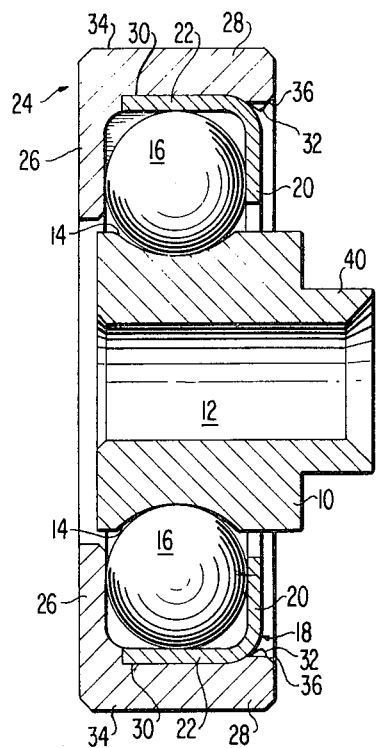
FIG. 1 is a longitudinal axis sectional view of the assembled wheel-bearing structure of this invention.

The assembled bearing structure is presented in FIG. 1 where a hub member 10 has a central aperture 12 and a grooved outer surface 14 which serves as the inner race for balls 16 of the ball bearing. A stamped metal cup 18 provides the outer race of the bearing assembly. The cup includes a centrally apertured radial wall 20 and an annular peripheral wall 22 arranged substantially perpendicular to each other, thereby partially enclosing the balls 16.

A tire member 24 includes a flange 26 and a peripheral tread 28 and is made of nylon or other suitable thermoplastic material. Peripheral tread 28 is arranged substantially perpendicular to flange 26 and has a grooved inner surface 30 and an integral lip portion 32, both of which are constructed to cooperate with peripheral wall 22 of the stamped metal cup in forming a secure engagement when assembling the bearing structure.

The outer race 18 is formed by stamping a hard, strong metallic material into an annular cup-shape, thereby providing a hardened high strength outer race for ball 16. Forming the cup by stamping is of considerable importance in that it increases the hardness and strength of the cup member, thereby providing an outer race which has a long operational life and which is capable of carrying heavy loads. Forming the outer race by stamping is additionally advantageous in reducing the production time and costs of the race member.

Tire member 24 is made from a firm plastic material, such as nylon, which provides the bearing structure with the desired feature of quietness and smoothness in operation when a running surface 34 moves along a metal surface or track. In assembling the bearing structure, the peripheral tread 28 of the tire is fitted over the peripheral wall 22 of the stamped metal cup 18. Secure frictional engagement between the peripheral walls of the tire and the metal cup is ensured by providing the inner surface of peripheral tread 28 with groove 30 constructed to cooperate with the configuration of peripheral wall 22 of the cup. In addition, peripheral tread 28 of the tire includes an overlapping lip portion 32 which serves to further maintain the peripheral wall 22 of the metal cup 18 in proper alignment and engagement.

Figure 2:
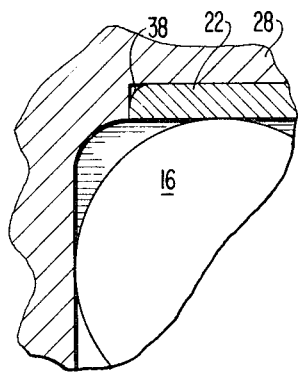
FIG. 2 is a fragmentary sectional view of an enlarged portion of the stamped metal cup.
Figure 4:
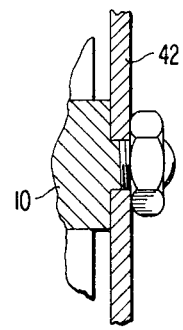
FIG. 4 is a detailed sectional view of a portion of the central hub including fastening means.

In order to facilitate assembling of the bearing structure, the outermost edge 38 of peripheral wall 22 of cup 18 is rounded, as shown in FIG. 2. This rounded edge 38 cooperates with chamfered portions 36 of lip 32, thereby allowing easier entry of the peripheral wall 22 as it is pressed into engagement with tire 24. It should be pointed out that groove 30 and lip portion 32 are not limited to the configuration shown but may be varied dependent upon the shape of cup member 18 and the particular configuration best suited to establish a secure engagement between the peripheral walls 22 and 28.

Figure 3:
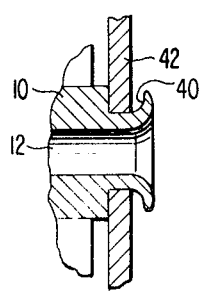
FIG. 3 is a detailed sectional view of a portion of the central hub.

A further structural feature of the present invention resides in the provision of a reduced diameter portion 40 on hub 10. This enables the bearing structure to be attached by riveting it to any object 42 which is to be supported by the bearing-wheel structure, see FIG. 3. The ability of the assembled bearing structure to be easily and quickly fastened in place obviously reduces the assembly and production costs of the finished product, of which the bearing assembly is a part.

The present invention presents an improved bearing structure for a wheel or like device having the combined feature of being capable of carrying relatively heavy loads, while at the same time providing smooth, quiet and trouble-free operation. Furthermore, the present invention is an improvement over prior art bearing structures in its ease of assembly due to the simplicity and cooperating nature of the structural components.

It should be understood that the inventive concept presented herein can be modified in various structures from that shown without departing from the spirit and scope of the invention which is set forth in the following claims. For example, the retaining lip or tire tread configuration could be a variety of shapes to accomplish the same function.

What is claimed is:

1. A ball bearing-wheel assembly comprising: a hub having a grooved outer surface which serves as an inner bearing race; a stamped metal cup having a centrally apertured radial wall and an annular-shaped peripheral wall arranged substantially perpendicular to each other, the peripheral wall of the cup serving as an outer bearing race; a plurality of anti-friction balls positioned between the inner and outer bearing races; an annular cup-shaped tire member of plastic material having a radial flange and a peripheral tread arranged substantially perpendicular to each other, an inner peripheral surface of the tire member dimensioned to form a secure frictional engagement with the peripheral wall of the stamped metal cup, the bearing assembly being arranged so that the inner peripheral surface of the tire member encloses the peripheral wall of the stamped metal cup, the balls being retained in bearing contact with the inner surface of the peripheral wall of the outer race formed by the stamped metal cup and the inner race by means of the radial wall of the cup and the tire radial flange located on opposite sides of the balls, whereby the assembly is both quiet and smooth in operation and capable of carrying heavy loads.

2. A ball bearing-wheel assembly as described in claim 1 wherein the central hub includes means to fasten the assembly to a support structure by riveting, said means comprising a reduced diameter portion extending beyond a plane defined by a lateral face of the assembly.

3. A ball bearing-wheel assembly as described in claim 1 wherein the tread wall of the tire has a grooved inner surface and an integral overlapping lip portion which cooperates with the peripheral wall of the stamped metal cup, thereby providing secure frictional engagement between the peripheral wall of the cup and the tire.

4. A ball bearing-wheel assembly as described in claim 3 wherein the peripheral wall of the stamped metal cup has a rounded corner along an outside edge thereof to facilitate non-abrasive passage of said cup against an angled corner along the innermost edge of the lip portion during assembly.

5. A ball bearing wheel assembly as in claim 1 wherein the inner surface of the peripheral tread of the annular cup shaped plastic tire member has an annular groove therein which cooperates with a portion of the outer surface of the peripheral wall of the stamped metal cup to hold the metal cup in the plastic tire member.

6. A ball bearing assembly comprising:
 a. an inner ball race with a ball receiving groove in the outer peripheral thereof,
 b. a plurality of bearing balls disposed in the groove of the inner race,
 c. an outer shell of plastic material coaxial with the inner race and having an opening to accommodate the inner race, the outer shell including an integral tire like peripheral flange and a disc like radially extending ball bearing retaining wall so that the shell is generally L-shaped in section, and an annular race retaining groove in the inner surface of the shell flange,
 d. an annular outer race of hard metal including a portion on the outer periphery thereof retained in the retaining groove of the shell and an inner surface portion retaining the bearing balls radially and axially, the inner surface portion retaining the balls axially being positioned on the side of the balls opposite the disc-like ball bearing retaining wall of the shell.

* * * * *